(12) United States Patent
Fan et al.

(10) Patent No.: US 11,732,640 B2
(45) Date of Patent: Aug. 22, 2023

(54) ROTARY ENGINE

(71) Applicant: JIANGSU UNIVERSITY, Zhenjiang (CN)

(72) Inventors: Baowei Fan, Zhenjiang (CN); Yonghao Zeng, Zhenjiang (CN); Yuanguang Wang, Zhenjiang (CN); Jianfeng Pan, Zhenjiang (CN); Xin Wu, Zhenjiang (CN); Xiaolei Qi, Zhenjiang (CN); Jiaxin Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 44 days.

(21) Appl. No.: 17/628,208

(22) PCT Filed: Mar. 2, 2021

(86) PCT No.: PCT/CN2021/078610
§ 371 (c)(1),
(2) Date: Jan. 18, 2022

(87) PCT Pub. No.: WO2022/165888
PCT Pub. Date: Aug. 11, 2022

(65) Prior Publication Data
US 2023/0151762 A1 May 18, 2023

(30) Foreign Application Priority Data

Feb. 4, 2021 (CN) .......................... 202110155866.X

(51) Int. Cl.
*F02B 53/00* (2006.01)
*F02B 55/02* (2006.01)
(Continued)

(52) U.S. Cl.
CPC .............. *F02B 53/00* (2013.01); *F02B 55/02* (2013.01); *F02B 55/08* (2013.01); *F02B 75/40* (2013.01)

(58) Field of Classification Search
CPC .......... F02B 53/00; F02B 55/02; F02B 55/08; F02B 75/40
(Continued)

(56) References Cited

U.S. PATENT DOCUMENTS 3,563,223 A * 2/1971 Ishida ................... F16F 15/264
123/61 R
3,967,599 A * 7/1976 Townsend ............... F02B 25/00
123/44 D
(Continued)

FOREIGN PATENT DOCUMENTS

CN 203321677 U 12/2013
GB 1007250 A 10/1965
(Continued)

*Primary Examiner* — J. Todd Newton
(74) *Attorney, Agent, or Firm* — Bayramoglu Law Offices LLC

(57) ABSTRACT

A rotary engine includes a housing, a crank dual-slider connecting rod mechanism, and rotary casings. The vertically arranged sliding grooves are provided in the housing. The crank dual-slider connecting rod mechanism is mounted on the housing. Sliders of the crank dual-slider connecting rod mechanism are respectively located in the sliding groove. The sliders are driven by a rotation of a crank to periodically compress a gas in the sliding grooves. The two rotary casings configured to rotate synchronously are mounted on an outer side of the housing. Each of the rotary casings is provided with a combustion chamber. Any of the rotary casings is in a transmission connection with a main shaft via a transmission system. The rotary casings drive the
(Continued)

main shaft to rotate through a combustion of a compressed gas in the combustion chambers. The rotary engine achieves a good seal.

8 Claims, 8 Drawing Sheets

(51) Int. Cl.
   *F02B 55/08* (2006.01)
   *F02B 75/40* (2006.01)
(58) Field of Classification Search
   USPC ............ 418/61.2, 140, 187, 61.1; 123/18 A, 123/18 R, 43 A, 45 A, 45 R, 200–249; 60/39.55
   See application file for complete search history.

(56) References Cited

U.S. PATENT DOCUMENTS

| | | | | |
|---|---|---|---|---|
| 4,144,866 A | * | 3/1979 | Hakner | ............ F01C 1/44 418/270 |
| 4,166,438 A | * | 9/1979 | Gottschalk | ............ F01B 13/045 417/462 |
| 5,365,892 A | * | 11/1994 | Kienle | ............ F02B 57/08 123/44 D |
| 2005/0142250 A1 | * | 6/2005 | Garwood | ............ A23B 4/12 426/35 |
| 2007/0286759 A1 | | 12/2007 | Patterson | |

FOREIGN PATENT DOCUMENTS

| | | |
|---|---|---|
| WO | 2014135908 A2 | 9/2014 |
| WO | 2017146599 A1 | 8/2017 |

* cited by examiner

ROTARY ENGINE

CROSS REFERENCE TO THE RELATED APPLICATIONS

This application is the national phase entry of International Application No. PCT/CN2021/078610, filed on Mar. 2, 2021, which is based upon and claims priority to Chinese Patent Application No. 202110155866.X, filed on Feb. 4, 2021, the entire contents of which are incorporated herein by reference.

TECHNICAL FIELD

The present invention relates to the technical field of internal combustion engines, in particular to a rotary engine.

BACKGROUND

Internal combustion engines may be categorized into reciprocating piston engines and rotary piston engines according to the structure and movement pattern thereof. Compared with reciprocating engines having complex parts, rotary piston engines are widely used due to the advantages such as simple structure and high power-to-weight ratio. There are many types of rotary piston engines. The most representative one is the Wankel rotary engine. However, the rotor-shaped pistons in the Wankel rotary engine have to undergo an eccentric motion due to the special structure and operation mode. The eccentric motion of the rotor-shaped pistons of the Wankel rotary engine causes an uneven force on the apex seal plate of the engine, resulting in deformation and vibration, which will eventually lead to a severe sealing problem of the Wankel rotary engine. Further, the sealing problem of the Wankel rotary engine causes fuel leakage and combustion deterioration, which in turn leads to a low efficiency of the rotary engine.

SUMMARY

In view of the shortcomings in the prior art, the present invention provides a rotary engine. The novel rotary engine is designed with two combustion chambers, and the power operation mechanisms of the two combustion chambers are realized by two identical systems. The circular motion of the combustion chambers of the rotary engine can avoid the problem of the Wankel rotary engine that the force received by the seal plate is uneven due to the eccentric motion of the rotor-shaped pistons, thereby achieving a good seal. Therefore, the novel rotary engine well solves the sealing problem and has a higher combustion efficiency.

The above technical object of the present invention is attained with the following technical means.

A rotary engine, including a housing, a crank dual-slider connecting rod mechanism, and rotary casings, where two vertically arranged sliding grooves are provided in the housing, the crank dual-slider connecting rod mechanism is mounted on the housing, sliders of the crank dual-slider connecting rod mechanism are respectively located in the sliding grooves, and the sliders are driven by a rotation of a crank to periodically compress a gas in the sliding grooves; and the two rotary casings configured to rotate synchronously are mounted on an outer side of the housing, and each of the rotary casings is provided with a combustion chamber, any of the rotary casings is in a transmission connection with a main shaft via a transmission system, and the rotary casings drive the main shaft to rotate through a combustion of a compressed combustible gas mixture in the combustion chambers.

Further, the crank dual-slider connecting rod mechanism includes a first slider assembly, a second slider assembly, a third connecting rod, a sixth connecting rod, and a connecting piece, where the first slider assembly and the second slider assembly are connected by the third connecting rod, and one end of the third connecting rod is provided with a guide groove; and one end of the sixth connecting rod is connected to the guide groove by a sliding pair, the other end of the sixth connecting rod is connected to the two rotary casings, respectively, and the sixth connecting rod is driven by a synchronous rotation of the two rotary casings to drive the first slider assembly and the second slider assembly to reciprocate in the sliding grooves, respectively.

Further, an intake sealing baffle and an exhaust sealing baffle which are movable are respectively provided at two ends of each of the sliding grooves, the intake sealing baffle is connected to the exhaust sealing baffle by a connecting rod, a space between the intake sealing baffle and one end of the sliding groove form an intake chamber, and the intake sealing baffle is driven by the slider in the sliding groove to compress a gas in the intake chamber; and a space between the exhaust sealing baffle and the other end of the sliding groove forms an exhaust chamber.

Further, a volume of the combustion chamber in each of the rotary casings shrinks along a rotation direction, and a phase angle between the combustion chambers in the two rotary casings is 180°.

Further, one end of the combustion chamber is a tapering-space large end, the other end of the combustion chamber is a tapering-space small end, and a space between the tapering-space large end and the tapering-space small end shrinks along the rotation direction; a phase angle between the tapering-space large end and the tapering-space small end is 180°; and there is a smooth transition between the tapering-space small end and a wall surface of the rotary casing.

Further, the combustion chamber further includes a transition space, a position that the tapering-space large end reaches after tapering by 20° to 30° along the rotation direction is a starting point of the transition space, a phase angle of the transition space does not exceed 5°, and a ratio between cross-sectional areas at the starting point and an end point of the transition space is 5:2; and a ratio between cross-sectional areas at the tapering-space large end and the starting point of the transition space is 5:4. A volume of a space between the tapering-space; small end and the transition space shrinks along the rotation direction.

Further, the rotary engine further includes an outlet blocking piece and a first sealing ring, a first hole is provided on the housing at a position near the intake chamber, a first compression spring is mounted in the first hole, one end of the outlet blocking piece is connected to the first compression spring, the first sealing ring is mounted on the other end of the outlet blocking piece, and the first sealing ring is in a sealed contact with a wall surface of the combustion chamber or a wall surface of the rotary casing during rotation of the rotary casing by the first compression spring.

Further, the rotary engine further includes a tail blocking piece and a second sealing ring, a second hole is provided on the housing at a position near the exhaust chamber, a second compression spring is mounted in the second hole, one end of the tail blocking piece is connected to the second compression spring, the second sealing ring is mounted on the other end of the tail blocking piece, and the second sealing ring is in a sealed contact with a wall surface of the combustion chamber or a wall surface of the rotary casing during rotation of the rotary casing by the second compression spring.

The beneficial effects of the present invention are as follows.

1. The rotary engine of the present invention can avoid the problem of the Wankel rotary engine that the force received by the seal plate is uneven due to the eccentric motion of the rotor-shaped pistons, thereby achieving a good seal. Therefore, the novel rotary engine of the present invention can avoid the leakage problem of the Wankel rotary engine.

2. The rotary engine of the present invention uses rotary casings with a 180" tapering space as the combustion chambers, and the tapering-space large end is of a regular shape, which can effectively avoid the drawback of the long and narrow combustion chamber in conventional Wankel rotary engines and is conducive to the rapid spread of combustions.

3. The exhaust gas with higher temperature and pressure discharged during the exhaust stroke of the rotary engine of the present invention can assist the movement of the exhaust sealing baffle, thereby effectively realizing the utilization of exhaust gas and improving the efficiency of the engine.

Figure 1:
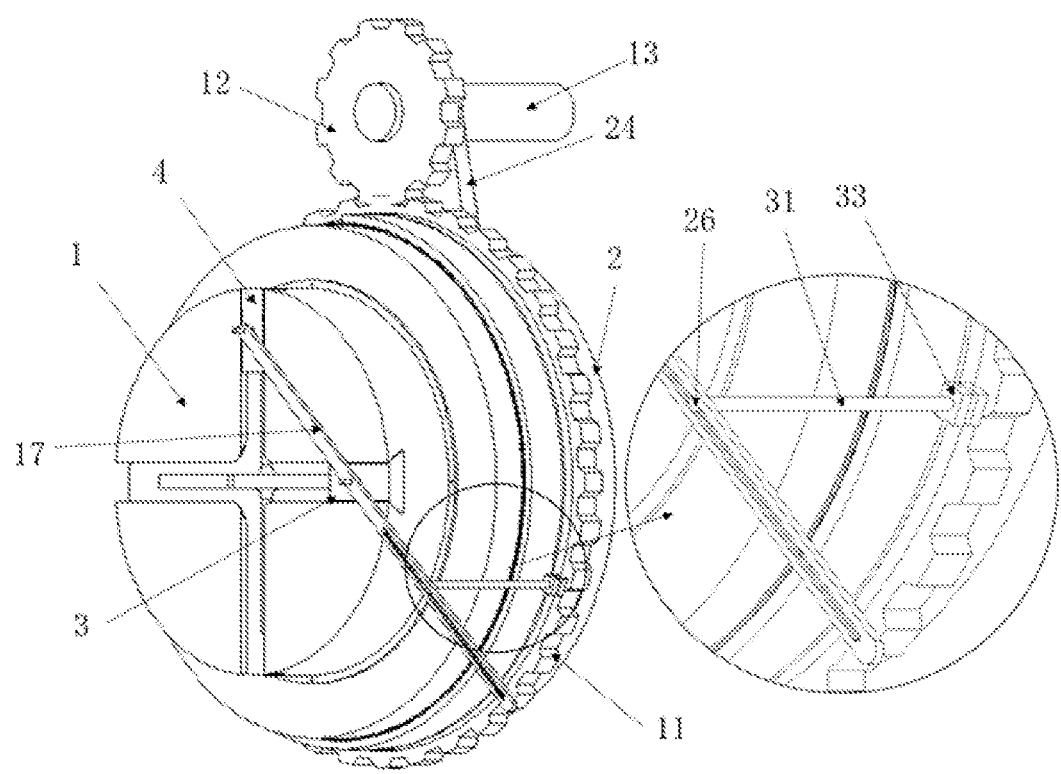
FIG. 1 is an assembly view of a rotary engine according to the present invention.

1—upper housing; 2—lower housing; 3—first slider; 4—second slider; 5—first push block; 6—second push block; 7—first connecting rod; 8—second connecting rod; 9—first rotary casing; 10—second rotary casing; 11—first outer gear; 12—second outer gear; 13—main shaft; 14—first sealing ring; 15—first combustion chamber; 16—first intake sealing baffle; 17—third connecting rod; 18—outlet blocking piece; 19—tail blocking piece; 20—second sealing ring; 21—first exhaust sealing baffle; 22—first intake passage; 23—first exhaust passage; 24—support base; 25—spark plug; 26—third slider; 27—fourth connecting rod; 28—fifth connecting rod; 29—second intake sealing baffle; 30—seal ring; 31—sixth connecting rod; 32—tapering-space large end; 33—connecting piece; 34—second exhaust sealing baffle; 35—tapering-space small end; 36—first one-way valve; 37—first gas intake valve.

DETAILED DESCRIPTION OF THE EMBODIMENTS

Hereunder the present invention will be further described in detail with reference to drawings and embodiments, but the protection scope of the present invention is not limited thereto.

Embodiments of the present invention will be exemplarily described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present invention.

In the description of the present invention, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present invention and simplifying the description, rather than indicating or implying that the apparatus or element described must have a specific orientation or be constructed and operated in a specific orientation, and therefore are not to be construed as limiting the present invention. Moreover, the terms "first" and "second" are used herein for purposes of description, and are not intended to indicate or imply relative importance or implicitly point out the number of the indicated technical feature. Therefore, the features defined by "first", and "second" may explicitly or implicitly include one or more features. In the description of the present invention, "plural" means two or more, unless it is defined otherwise specifically.

In the present invention, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present invention can be understood according to specific circumstances.

Figure 2:
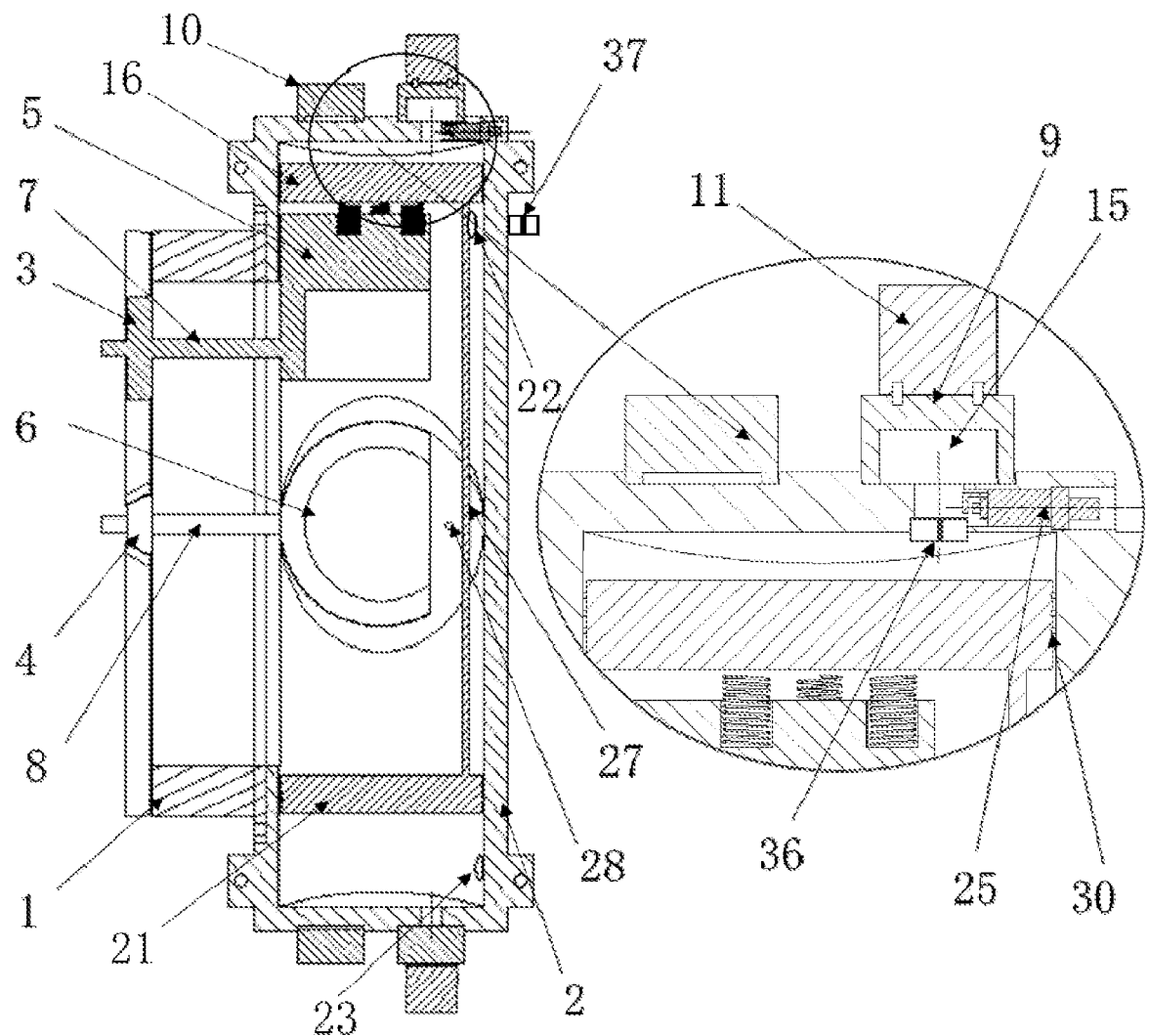
FIG. 2 is an internal cross-sectional view of the engine according to the present invention.

As shown in FIG. 1 and FIG. 2, a rotary engine of the present invention includes a housing, a crank dual-slider connecting rod mechanism, a first rotary casing 9, and a second rotary casing 10. The housing includes an upper housing 1 and a lower housing 2. The upper housing 1 and the lower housing 2 are fixedly assembled. First grooves crossing each other are provided on an upper surface of the upper housing 1. A first slider 3 and a second slider 4 are respectively located in the first grooves. A movement direction of the first slider 3 is perpendicular to a movement direction of the second slider 4. Second grooves crossing each other are provided in the lower housing 2. A first push block 5 and a second push block 6 are respectively located in the second grooves. A movement direction of the first push block 5 is perpendicular to a movement direction of the second push block 6. The first rotary casing 9 and the second rotary casing 10 are respectively mounted on an outer side of the lower housing 2. The first rotary casing 9 and the second rotary casing 10 are each provided with a combustion chamber.

Figure 3:
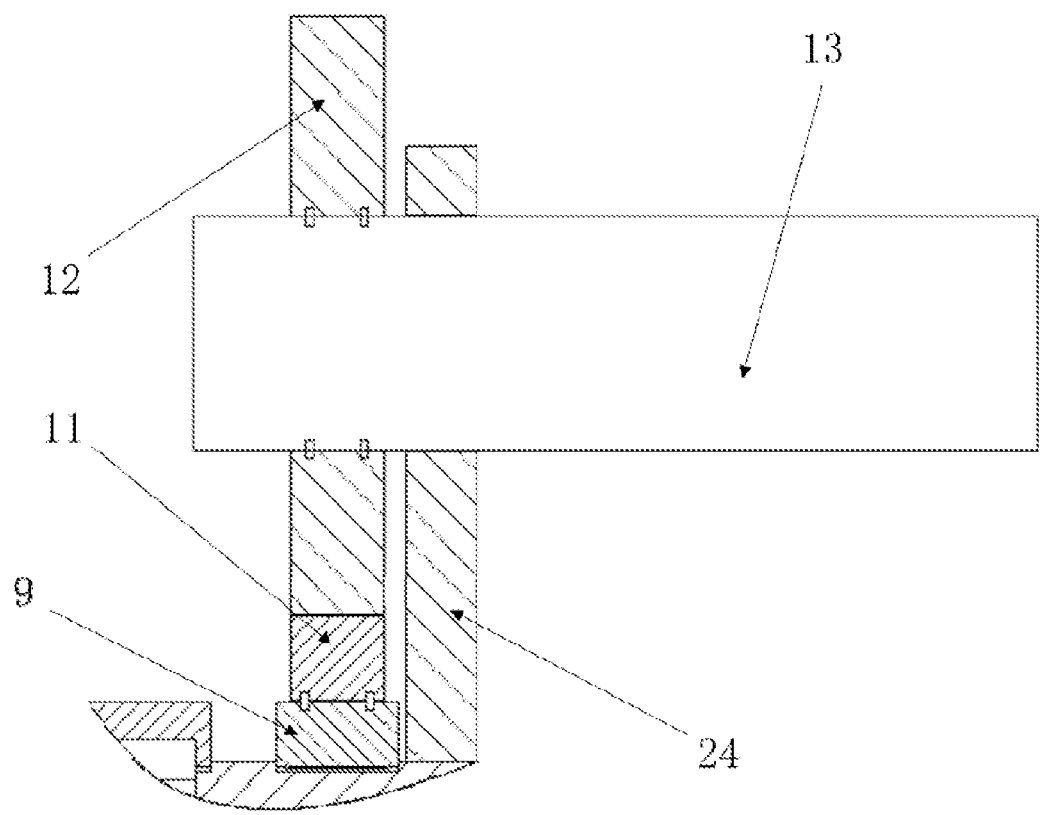
FIG. 3 is a schematic view of a power output structure of the engine according to the present invention.

The crank dual-slider connecting rod mechanism includes a first slider assembly, a second slider assembly, a third connecting rod 17, a sixth connecting rod 31, and a connecting piece 33. The first slider assembly includes a first slider 3, the first push block 5, and a first connecting rod 7. The first slider 3 and the first push block 5 are connected by the first connecting rod 7 so that the first slider 3 moves synchronously with the first push block 5. The second slider assembly includes a second slider 4, the second push block 6, and a second connecting rod 8. The second slider 4 and the second push block 6 are connected by the second connecting rod 8, so that the second slider 4 moves synchronously with the second push block 6. As required by the reciprocating movement of the first connecting rod 7 and the second connecting rod 8, through grooves are used in the upper housing 1 and the lower housing 2 on the movement paths of the first connecting rod 7 and the second connecting rod 8. The first slider 3 and the second slider 4 are connected by the third connecting rod 17. The first slider 3 and the second slider 4 respectively undergo periodic reciprocating movements in the first grooves on the upper surface of the upper casing 1, and the movement trajectory of the third connecting rod 17 is a periodic elliptical trajectory. A guide groove is provided at one end of the third connecting rod 17. A movable third slider 26 is mounted in the guide groove. One end of the sixth connecting rod 31 is connected to the third slider 26, and the other end of the sixth connecting rod 31 is respectively connected to the first rotary casing 9 and the second rotary casing 10 through the connecting piece 33, so that the first rotary casing 9 and the second rotary casing 10 rotate synchronously. The design of the guide groove at one end of the third connecting rod 17 and the third slider 26 can realize the synchronous rotation of the first rotary casing 9 and the second rotary casing 10 through the sixth connecting rod 31 to drive the third connecting rod 17 to rotate. The rotation of the third connecting rod 17 causes the first push block 5 and the second push block 6 to periodically compress a gas in the second grooves, respectively. As shown in FIG. 3, the first rotary casing 9 is in a transmission connection with a main shaft 13 via a transmission system, and the first rotary casing 9 drives the main shaft 13 to rotate by a combustion of a compressed combustible gas mixture in the combustion chamber.

As shown in FIG. 2, the second grooves crossing each other are configured as a first sliding groove and a second sliding groove perpendicular to each other. A first intake sealing baffle 16 and a first exhaust sealing baffle 21 which are movable are respectively provided at two ends of the first sliding groove. The first intake sealing baffle 16 is connected to the first exhaust sealing baffle 21 by a fourth connecting rod 27, to realize linkage between the first intake sealing baffle 16 is connected to the first exhaust sealing baffle 21. The length of the fourth connecting rod 27 ensures that no matter how the first push block 5 moves, the first intake sealing baffle 16 and the first exhaust sealing baffle 21 will not move to the positions of the through grooves, thereby ensuring that a sealed intake chamber and a sealed exhaust chamber are formed in the lower housing 2. A space between the first intake sealing baffle 16 and one end of the first sliding groove forms a first intake chamber. A first intake passage 22 is provided in the first intake chamber. A first intake valve 37 for controlling gas intake is provided outside the first intake passage 22. The first push block 5 in the first sliding groove drives the first intake sealing baffle 16 to compress the combustible gas mixture in the intake chamber, to obtain a compressed combustible gas mixture. A space between the first exhaust sealing baffle 21 and the other end of the first sliding groove forms a first exhaust chamber. A first exhaust passage 23 is provided in the first exhaust chamber. During the rotation of the rotary casing, the exhaust gas is squeezed by the tail blocking piece 19 and discharged through the first exhaust passage 23. The first intake sealing baffle 16 and the first exhaust sealing baffle 21 are each provided with a seal ring 30 for sealing with a wall surface of the first sliding groove. The first intake chamber is provided with a passage that can communicate with a first combustion chamber 15 in the first rotary casing 9. A spark plug 25 is mounted on the passage. A first one-way valve 36 is provided on the side of the passage which is close to the first intake chamber. The first one-way valve 36 is configured to prevent exhaust gas formed by a combustion of a gas in the first combustion chamber 15 from flowing back into the first intake chamber. The opening and closing of the first intake valve 37 and the ignition of the spark plug 25 are controlled by an electronic control system. The first exhaust chamber is provided with a passage that can communicate with the first combustion chamber 15 in the first rotary casing 9. Similarly, a second intake sealing baffle 29 and a second exhaust sealing baffle 34 which are movable are respectively provided at two ends of the second sliding groove. The second intake sealing baffle 29 is connected to the second exhaust sealing baffle 34 by a fifth connecting rod 28, to realize linkage between the second intake sealing baffle 29 is connected to the second exhaust sealing baffle 34.

Figure 4:
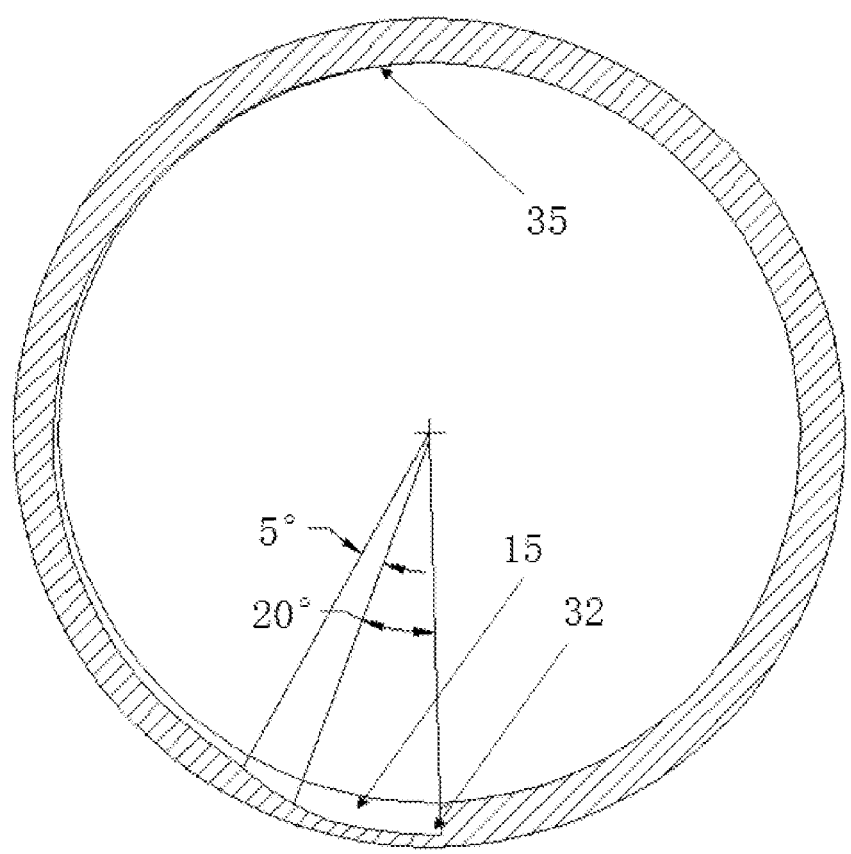
FIG. 4 is a cross-sectional view of the rotary casing according to the present invention.

As shown in FIG. 4, volumes of the combustion chambers in the first rotary casing 9 and the second rotary casing 10 shrink along a rotation direction, and a phase angle between the combustion chambers in the first rotary casing 9 and the second rotary casing 10 is 180°. Taking the first combustion chamber 15 in the first rotary casing 9 as an example, one end of the combustion chamber is a tapering-space large end 32, the other end of the combustion chamber is a tapering-space small end 35, and a space between the tapering-space large end 32 and the tapering-space small end 35 shrinks along the rotation direction. A phase angle between the tapering-space large end 32 and the tapering-space small end 35 is 180°. There is a smooth transition between the tapering-space small end 35 and a wall surface of the first rotary casing 9. The combustion chamber further includes a transition space, a position that the tapering-space large end 32 reaches after tapering by 20 to 30° along the rotation direction is a starting point of the transition space, a phase angle of the transition space does not exceed 5°, and a ratio between cross-sectional areas at the starting point and an end point of the transition space is 5:2. A ratio between cross-sectional areas at the tapering-space large end 32 and the starting point of the transition space is 5:4. The design of the tapering-space large end 32 of a regular shape can ensure that the combustion chamber has a relatively large and regular shape, which can effectively avoid the drawback of the long and narrow combustion chamber in conventional Wankel rotary engines and is conducive to the rapid spread of combustions. The abrupt shrinkage at the transition part can effectively increase the gas flow rate in the combustion chamber, which is conducive to promote the rotation of the rotary casing and improve the efficiency of the engine.

Figure 5:
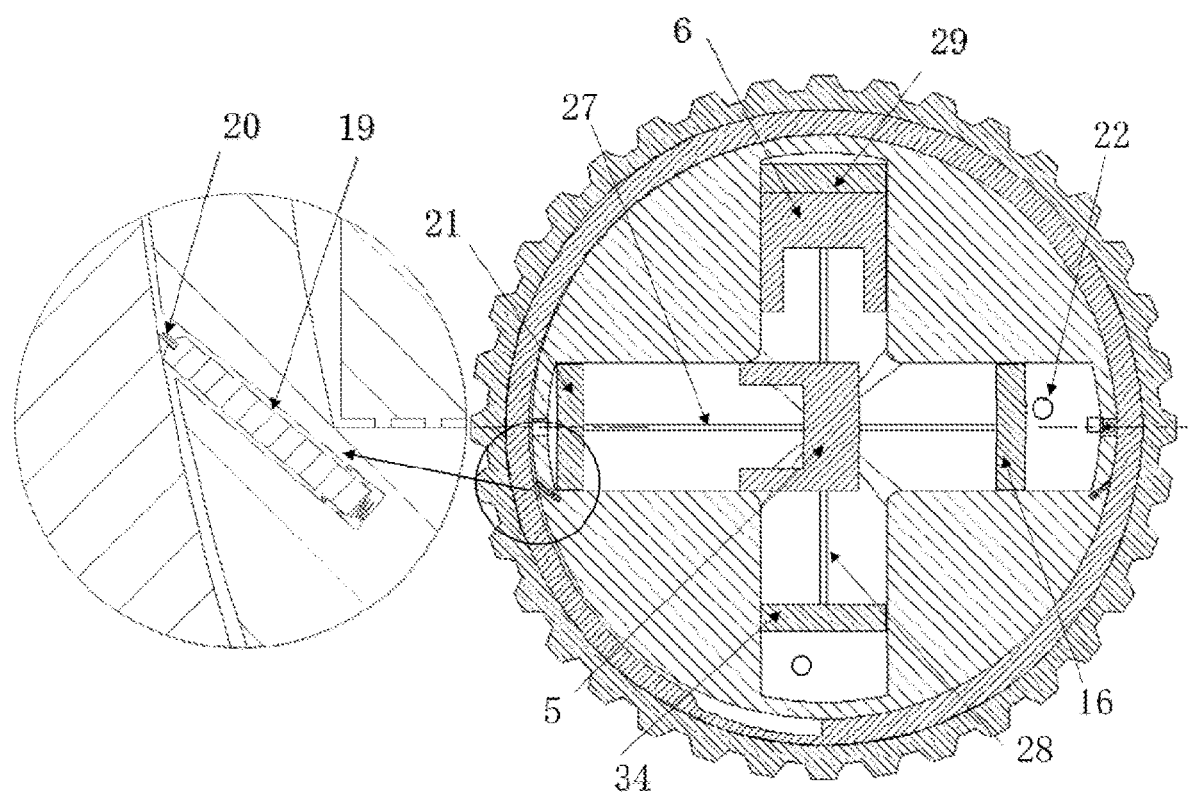
FIG. 5 is a schematic view illustrating an intake stroke of the engine according to the present invention.
Figure 6:
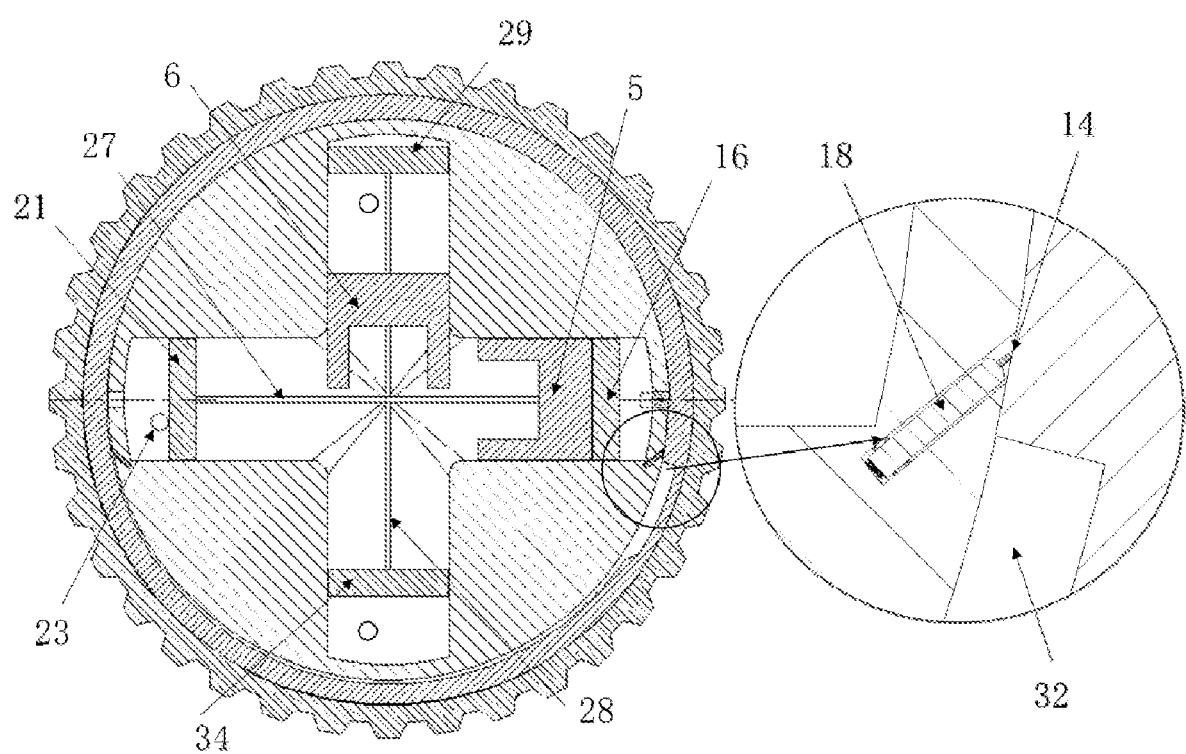
FIG. 6 is a schematic view illustrating a compression stroke of the engine according to the present invention.

As shown in FIG. 5 and FIG. 6, taking the first rotary casing 9 as an example, a first hole is provided on the lower housing 2 at a position near the first intake chamber, a first compression spring is mounted in the first hole, one end of the outlet blocking piece 18 is connected to the first compression spring, the first sealing ring 14 is mounted on the other end of the outlet blocking piece 18, and the first sealing ring 14 is in a sealed contact with a wall surface of the first combustion chamber 15 or the wall surface of the first rotary casing 9 during rotation of the first rotary casing 9 by the first compression spring. A second hole is provided on the lower housing 2 at a position near the first exhaust chamber, a second compression spring is mounted in the second hole, one end of the tail blocking piece 19 is connected to the second compression spring, the second sealing ring 20 is mounted on the other end of the tail blocking piece 19, and the second sealing ring 20 is in a sealed contact with the wall surface of the combustion chamber 15 or the wall surface of the first rotary casing 9 during rotation of the first rotary casing 9 by the second compression spring. The function of the outlet blocking piece 18 is that during the rotation of the first rotary casing 9, the outlet blocking piece 18 is first pressed by the wall surface of the first rotary casing 9, and when the tapering-space large end 32 moves to the position of the outlet blocking piece 18, the outlet blocking piece 18 that is no longer pressed springs up and presses against the inner wall of the first combustion chamber 15 under the action of the first compression spring. The movement of the tail blocking piece 19 is similar to that of the outlet blocking piece 18. The second rotary casing 10 has the same structure.

In an embodiment, synchronous rotation of the first rotary casing 9 and the second rotary casing 10 is realized through the connecting piece 33. The combustion chambers in the two rotary casings are in a motion association with each other with a phase difference of 180°. The first rotary casing 9 is equipped with a first outer gear 11. The outer gear 11 is engaged with a second outer gear 12. The second outer gear 12 is mounted on the main shaft 13. The main shaft 13 is mounted on a support base 24. The specific configuration is as shown in FIG. 3. Thus, the rotation of the first rotary casing 9 is converted into the rotation of the main shaft 13 through gear meshing, so as to achieve the purpose of power output.

The working principle of the present invention is as follows. First, a combustible gas mixture is introduced into the first intake passage 22. The first slider 3 and the first push block 5 move toward the first intake sealing baffle 16. Upon contacting with the first intake sealing baffle 16, the first push block 5 pushes the first intake sealing baffle 16 to compress the combustible gas mixture. When the first push block 5 and the first intake sealing baffle 16 move to the top of the intake chamber, the first combustion chamber 15 in the first rotary casing 9 becomes in communication with the first intake chamber. At this moment, the outlet blocking piece 18 already springs up and presses against an inner wall of the first combustion chamber 15. The compressed combustible gas mixture enters the first combustion chamber 15, is ignited by the spark plug 25 to do work, to push the first rotary casing 9 to continue rotating. After the first rotary casing 9 is rotated by 180°, the first combustion chamber 15 becomes in communication with the first exhaust chamber. At this moment, the first slider 3 and the first push block 5 drive the first exhaust sealing baffle 21 to move to the top of the exhaust chamber, the first intake sealing baffle 16 returns to the initial position, and the outlet blocking piece 18 is pressed by the wall surface of the first rotary casing 9 to fall back into the first hole on the lower housing 2. As the first rotary casing 9 further rotates, the tad blocking piece 19 springs up, and the exhaust gas formed by combustion in the first combustion chamber 15 is squeezed into the first exhaust chamber by the tail blocking piece 19, and is further discharged from the first exhaust passage 23. After the first rotary casing 9 is rotated by 270°, the combustible gas mixture in the second combustion chamber in the second rotary casing 10 is ignited to do work. After the first rotary casing 9 is rotated by 360° the first slider 3, the first push block 5, and the first intake sealing baffle 16 move to their initial positions before the first combustion chamber 15 does work.

Operating strokes of the rotary engine according to the present invention include an intake stroke, a compression stroke, a combustion stroke, and an exhaust stroke. Hereunder the operating process of the present invention will be described in an embodiment of the operating strokes of the rotary engine. The design of the present invention adopts two layers of combustion chambers. Because the two layers of combustion chambers have the same operating process and assembly structure, and only their operating phases differ by 180°, so the operating process of the combustion system mainly consisting of the first push block 5 and the first rotary casing 9 is mainly described here.

The intake stroke of the rotary engine of the present invention is implemented as follows. At the moment when the first push block 5 moves rightward from the top of the first exhaust chamber, the electronic control system performs control to open the first intake valve 37 to allow fresh combustible gas mixture to enter the above-mentioned closed first intake chamber through the first intake passage 22, and the intake stroke begins. When the first push block 5 pushes the intake sealing baffle 16 to move rightward to pass over the first intake passage 22, the first intake passage 22 is no longer in communication with the first intake chamber, the electronic control system performs control to close the first intake valve 37, and the intake stroke ends. It should be noted that during the entire intake stroke, the first combustion chamber 15 in the first rotary casing 9 is in communication with the first exhaust chamber. Therefore, the intake stroke of the rotary engine of the present invention partially overlaps the exhaust stroke. FIG. 5 is a schematic view of a certain moment in the intake stroke of the first rotary casing 9. At the moment shown in FIG. 5, the combustion system mainly consisting of the second push block 6 and the second rotary casing 10 is in a combustion stage.

The compression stroke of the rotary engine of the present invention is implemented as follows. The first push block 5 pushes the first intake sealing baffle 16 to pass over the first intake passage 22 to compress the fresh combustible gas mixture inside the space of the first intake chamber, and the compression stroke begins. Subsequently, the first push block 5 continues to push the first intake sealing baffle 16 toward the top of the first intake chamber to continue compression. When the tapering-space large end 32 of the first rotary casing 9 moves to the outlet blocking piece 18, the outlet blocking piece 18 springs up, and the first rotary casing 9 continues to rotate until the first intake chamber becomes in communication with the first combustion chamber 15. The compression stroke ends. It should be noted that during the entire compression stroke, the tapering-space small end 35 of the first rotary casing 9 is partially in communication with the first exhaust chamber. Therefore, the compression stroke of the rotary engine of the present invention also partially overlaps the exhaust stroke. FIG. 6 is a schematic view of a certain moment in the compression stroke of the first rotary casing 9. At the moment shown in FIG. 6, the combustion system mainly consisting of the second push block 6 and the second rotary casing 10 is in a combustion stage.

Figure 7:
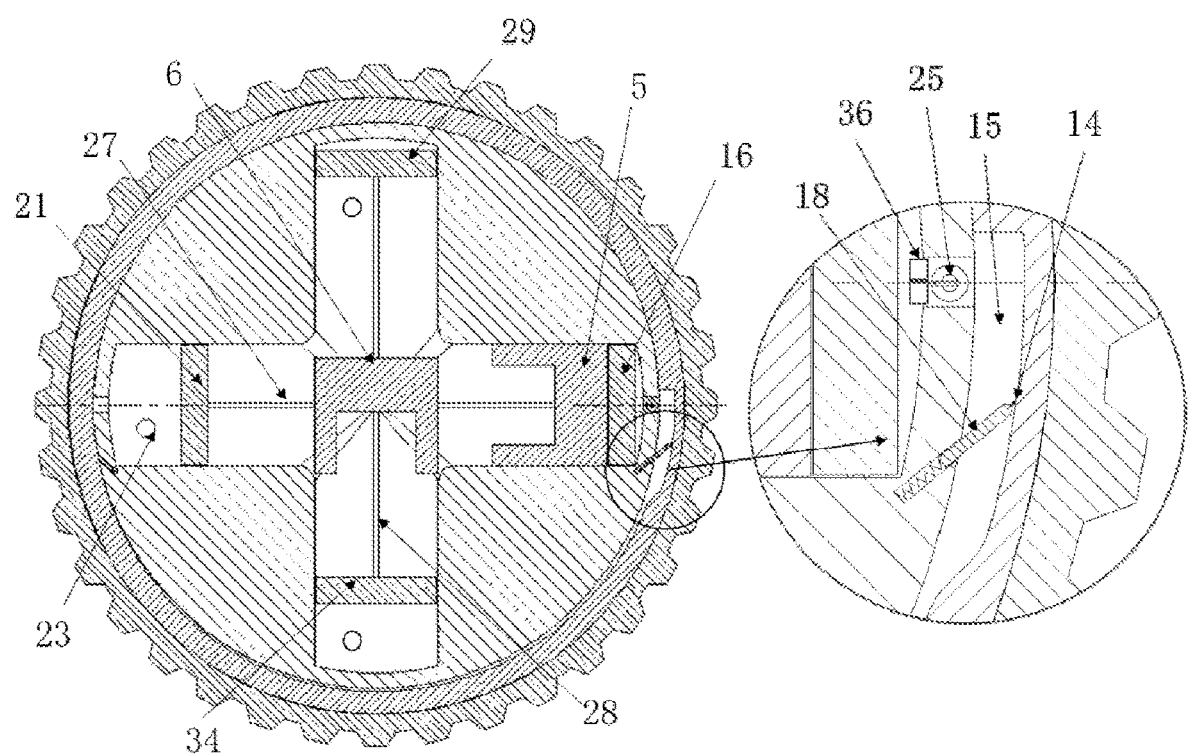
FIG. 7 is a schematic view illustrating a combustion stroke of the engine according to the present invention.

The combustion stroke of the rotary engine of the present invention is implemented as follows. When the tapering-space large end 32 of the first rotary casing 9 passes over the outlet blocking piece 18, the outlet blocking piece 18 springs up and presses against the inner wall of the first combustion chamber 15. The first rotary casing 9 continues to rotate until the first combustion chamber 15 becomes in communication with the first intake chamber, and the compressed combustible gas mixture enters the first combustion chamber 15. At this moment, the first push block 5 pushes the first intake sealing baffle 16 to the top of the first intake chamber, and this moment can be called a top stop point moment. At the top stop point moment, the combustible gas mixture is ignited by the spark plug 25 to do work to push the first rotary casing 9 to further rotate, and the combustion stroke starts. After the first rotary casing 9 is rotated by 180°, the first combustion chamber 15 is in communication with the first exhaust chamber, and the combustion stroke ends. FIG. 7 is a schematic view of a certain moment in the combustion stroke of the first rotary casing 9. At the moment shown in FIG. 7, the combustion system mainly consisting of the second push block 6 and the second rotary casing 10 is in a combustion stage.

Figure 8:
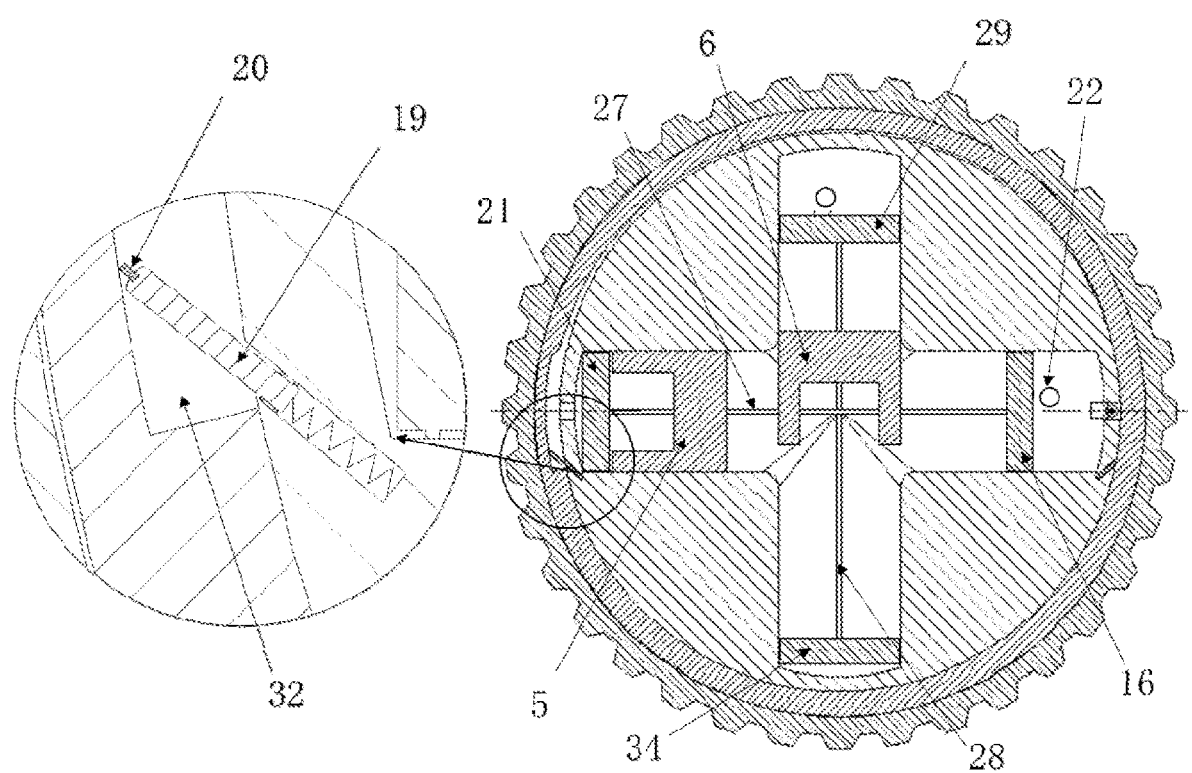
FIG. 8 is a schematic view illustrating an exhaust stroke of the engine according to the present invention.

The exhaust stroke of the rotary engine of the present invention is implemented as follows. When the first combustion chamber 15 in the first rotary casing 9 is in communication with the first exhaust chamber, the exhaust stroke starts. At this moment, the first exhaust sealing baffle 21 is located at the top of the first exhaust chamber under the push of the first push block 5. Further, the tapering-space large end 32 passes over the tail blocking piece 19, and the tail blocking piece 19 springs up and presses against the inner wall of the first combustion chamber 15 under the action of the second compression spring. As the first rotary casing 9 continues to rotate counterclockwise, the combustion exhaust gas is gradually squeezed into an inlet of the first exhaust chamber by the tail blocking piece 19. Since the combustion exhaust gas still has a relatively high temperature and pressure, the first exhaust sealing baffle 21 moves rightward under the pressure of the combustion exhaust gas. The first exhaust sealing baffle 21 can then drive the first intake sealing baffle 16 to move rightward through the fourth connecting rod 27, Therefore, this process effectively realizes the utilization of exhaust gas, thereby reducing the energy consumption and improving the efficiency of the engine. Next, as the first push block 5 continues to move toward the intake chamber, the first push block 5 contacts with the first intake sealing baffle 16 and drives the first intake sealing baffle 16 to move rightward. During this process, the first intake sealing baffle 16 can then drive the first air outlet sealing baffle 21 to move rightward through the fourth connecting rod 27. As the first exhaust sealing baffle 21 moves rightward, when the first exhaust sealing baffle 21 passes over the first exhaust passage 23, the first exhaust chamber is in communication with the first exhaust passage 23, and the combustion exhaust gas is discharged through the first exhaust passage 23. After the first rotary casing is rotated by 360° and the first combustion chamber 15 is in communication with the first intake chamber, the first combustion chamber 15 is no longer in communication with the first exhaust chamber. The exhaust stroke is over. FIG. 8 is a schematic view of a certain moment in the exhaust stroke of the first rotary casing 9. At the moment shown in FIG. 8, the combustion system mainly consisting of the second push block 6 and the second rotary casing 10 has completed the intake stroke and is in the stage where the intake and exhaust strokes overlap.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present invention, and the protection scope of the present invention is not limited thereto. Equivalent embodiments or changes can be made without departing from the technical spirit of the present invention, which are all embraced in the protection scope of the present invention.

What is claimed is:

1. A rotary engine, comprising a housing, a crank dual-slider connecting rod mechanism, and rotary casings, wherein two vertically arranged sliding grooves are provided in the housing, the crank dual-slider connecting rod mechanism is mounted on the housing, sliders of the crank dual-slider connecting rod mechanism are respectively located in the sliding grooves, and the sliders are driven by a rotation of a crank to periodically compress a gas in the sliding grooves; and the two rotary casings configured to rotate synchronously are mounted on an outer side of the housing, and each of the rotary casings is provided with a combustion chamber, any of the rotary casings is in a transmission connection with a main shaft via a transmission system, and the rotary casings drive the main shaft to rotate through a combustion of a compressed gas in the combustion chambers.

2. The rotary engine according to claim 1, wherein the crank dual-slider connecting rod mechanism comprises a first slider assembly, a second slider assembly, a third connecting rod, a sixth connecting rod, and a connecting piece; the first slider assembly and the second slider assembly are connected by the third connecting rod, and one end of the third connecting rod is provided with a guide groove; and one end of the sixth connecting rod is connected to the guide groove, the other end of the sixth connecting rod is connected to the two rotary casings, respectively, and the sixth connecting rod is driven by a synchronous rotation of the two rotary casings to drive the first slider assembly and the second slider assembly to reciprocate in the sliding grooves, respectively.

3. The rotary engine according to claim 1, wherein an intake sealing baffle and an exhaust sealing baffle which are movable are respectively provided at two ends of each of the sliding grooves, the intake sealing baffle is connected to the exhaust sealing baffle by a connecting rod, a space between the intake sealing baffle and one end of the sliding groove form an intake chamber, and the intake sealing baffle is driven by the slider in the sliding groove to compress a gas in the intake chamber; and a space between the exhaust sealing baffle and the other end of the sliding groove forms an exhaust chamber.

4. The rotary engine according to claim 1, wherein a volume of the combustion chamber in each of the rotary casings shrinks along a rotation direction, and a phase angle between the combustion chambers in the two rotary casings is 180°.

5. The rotary engine according to claim 4, wherein one end of the combustion chamber is a tapering-space large end, the other end of the combustion chamber is a tapering-space small end, and a space between the tapering-space large end and the tapering-space small end shrinks along the rotation direction; a phase angle between the tapering-space large end and the tapering-space small end is 180°; and there is a smooth transition between the tapering-space small end and a wall surface of the rotary casing.

6. The rotary engine according to claim 5, wherein the combustion chamber further comprises a transition space, a position that the tapering-space large end reaches after tapering by 20° to 30° along the rotation direction is a starting point of the transition space, a phase angle of the transition space does not exceed 5°, and a ratio between cross-sectional areas at the starting point and an end point of the transition space is 5:2; and a ratio between cross-sectional areas at the tapering-space large end and the starting point of the transition space is 5:4.

7. The rotary engine according to claim 3, further comprising an outlet blocking piece and a first sealing ring, wherein a first hole is provided on the housing at a position near the intake chamber, a first compression spring is mounted in the first hole, one end of the outlet blocking piece is connected to the first compression spring, the first sealing ring is mounted on the other end of the outlet blocking piece, and the first sealing ring is in a sealed contact with a wall surface of the combustion chamber or a wall surface of the rotary casing during rotation of the rotary casing by the first compression spring.

8. The rotary engine according to claim 3, further comprising a tail blocking piece and a second sealing ring, wherein a second hole is provided on the housing at a position near the exhaust chamber, a second compression spring is mounted in the second hole, one end of the tail blocking piece is connected to the second compression spring, the second sealing ring is mounted on the other end of the tail blocking piece, and the second sealing ring is in a sealed contact with a wall surface of the combustion chamber or a wall surface of the rotary casing during rotation of the rotary casing by the second compression spring.

* * * * *